(12) United States Patent
Kaspersion

(10) Patent No.: US 7,727,587 B2
(45) Date of Patent: Jun. 1, 2010

(54) METHOD OF MANUFACTURING HONEYCOMB AND FOAM COMPOSITE MATERIAL

(76) Inventor: Edward Kaspersion, 511 Mercy St., Selkirk, Manitoba (CA) R1A 2B2

( * ) Notice: Subject to any disclaimer, the term of this patent is extended or adjusted under 35 U.S.C. 154(b) by 237 days.

(21) Appl. No.: 11/959,763

(22) Filed: Dec. 19, 2007

(65) Prior Publication Data

US 2009/0162548 A1 Jun. 25, 2009

(51) Int. Cl.
*B05D 5/00* (2006.01)
(52) U.S. Cl. .................. 427/243; 427/244; 427/245; 427/316; 427/358; 427/373; 427/384; 428/117; 428/304.4; 428/313.3; 156/78; 156/79; 156/242
(58) Field of Classification Search ........... 427/243; 428/117; 156/78
See application file for complete search history.

(56) References Cited

U.S. PATENT DOCUMENTS 4,687,691 A * 8/1987 Kay .................. 428/73
5,338,594 A * 8/1994 Wang et al. ............ 428/117
6,156,146 A * 12/2000 Cundiff .................. 156/213
6,387,200 B1   5/2002 Ashmead
6,630,221 B1 * 10/2003 Wong .................... 428/117

\* cited by examiner

*Primary Examiner*—Nadine Norton
*Assistant Examiner*—Maki Angadi
(74) *Attorney, Agent, or Firm*—Adrian D. Battison; Ade & Company Inc.

(57) ABSTRACT

A composite product is formed from a honeycomb panel having an array of hexagonal tubular cells which clamped between two press plates where a layer of a foaming agent is applied to only the bottom press plate such that the foaming agent expands into the cells. An array of grooves is provided in the top press plate and connected at one or both edges of the plate to a source of vacuum so as to draw air through the grooves and cells. A sheet of a polyethylene material having the characteristics that it is permeable to air, substantially impermeable to liquid and resistant to bonding to the foam is applied onto the press plate to prevent the foam entering the grooves and bonding to the press plate while allowing the air to be drawn from the cells.

19 Claims, 2 Drawing Sheets

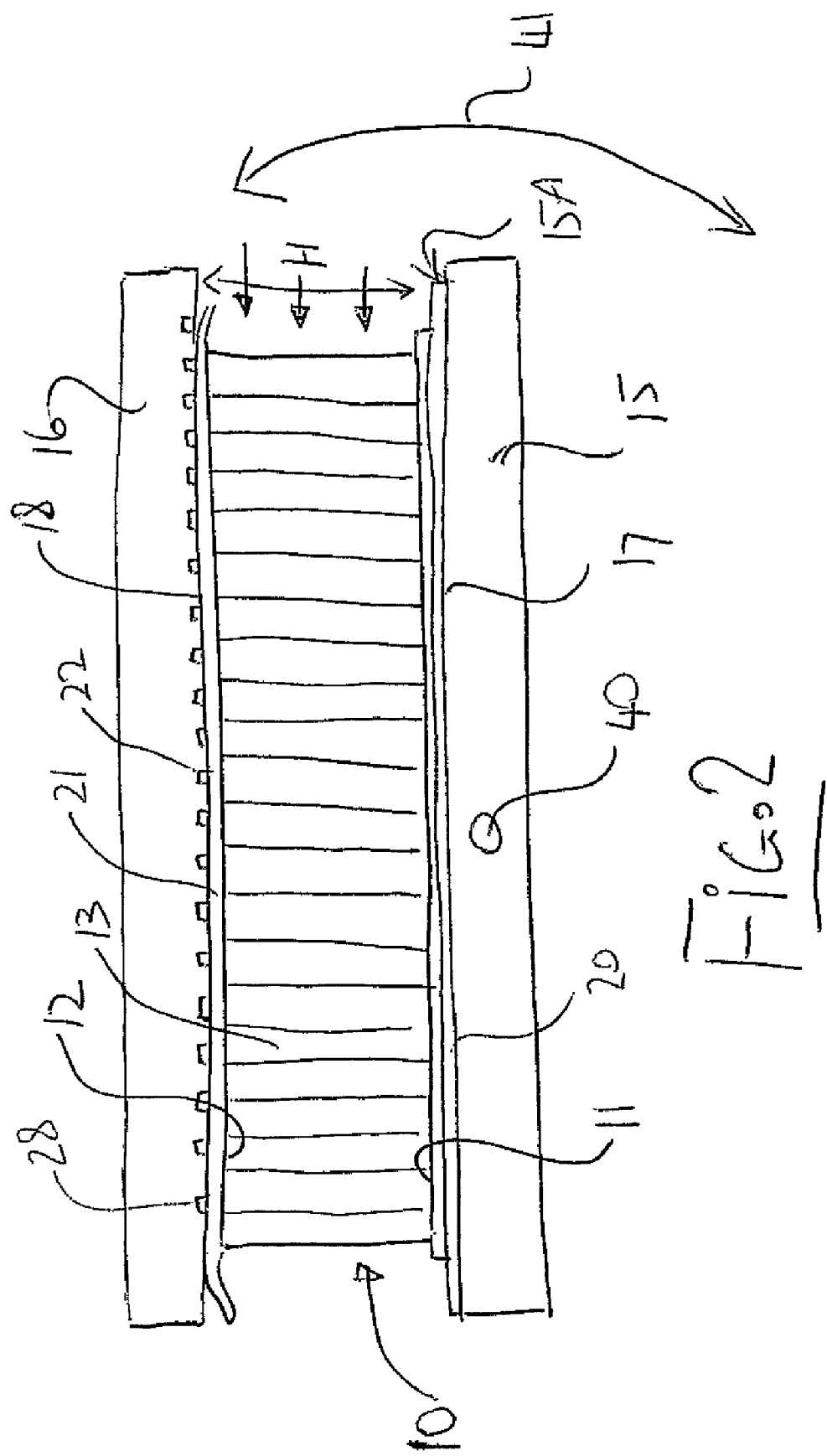

METHOD OF MANUFACTURING HONEYCOMB AND FOAM COMPOSITE MATERIAL

This invention relates to a composite material formed from a panel of a honeycomb cell material where the cells are filled with a reinforcing foam.

BACKGROUND OF THE INVENTION

A number of prior proposals have been made for filling a honeycomb panel with tubular cells with a reinforcing foam so as to provide an enhanced compression strength which is commonly significantly greater than the compression strength of the panel and the foam separately.

U.S. Pat. No. 5,338,594 (Wang) issued Aug. 6, 1994 assigned to Hexcel Corporation discloses a method for filling the cells where a foamable precursor film is applied to one face of the panel and held between two plates and placed in a hot press and heated under pressure. A release cloth is applied over the ends of the panel which is porous to allow the escape of the gases as the foaming action occurs. However this arrangement requires heat and pressure and hence is inconvenient. There is also a risk that the foam does not properly fill the cells with a constant density foam without voids.

U.S. Pat. No. 6,156,146 (Cundiff) issued Dec. 5, 2000 assigned to Boeing discloses using such a foam filled honeycomb product in a Resin Transfer Molding process.

U.S. Pat. No. 6,387,200 (Ashmead) issued May 14, 2002 assigned to Cellbond composites Limited discloses a method of filling the cells where a fibrous mat is placed over each face of the panel before the foam is injected through the mat into the cells so that the foam is absorbed into the mat to form a fiber reinforces skin at the end face of the honeycomb panel. Again this method has significant difficulty in properly filling the cells to the required constant density without voids.

SUMMARY OF THE INVENTION

It is one object of the invention to provide a method for filling the honeycomb cells of a panel with a reinforcing foam.

According to one aspect of the invention there is provided a method for manufacturing a composite product comprising:

providing a honeycomb panel having a first face and a second opposite face with an array of hexagonal tubular cells extending between the first and second faces;

providing a first press plate with a press surface in contact with the first face;

providing a second press plate with a press surface in contact with the second face;

at the first press plate applying a layer of a foaming agent such that the foaming agent expands from the first press plate into the cells so as to expand along the cells as the foaming agent forms the foam;

providing in the second press plate an array of conduits extending from the press surface of the second press plate to a source of vacuum so as to draw air through the conduits;

the cells and the conduits being arranged such that the end of each cell at the second press plate intersects with at least one of the conduits such that the drawing of air from the conduits acts to draw air from the cells;

and applying onto the first face of the panel between the conduits and the first face of the panel a sheet of a material having the characteristics that it is permeable to air, substantially impermeable to liquid and resistant to bonding to the foam.

Preferably the conduits comprise grooves in the press surface of the second press plate and extending along the second press plate to a position at or adjacent at least one side of the press plate. However other conduits such as holes through the plate can be used provided the conduits are sufficiently small in transverse dimension and the sheet of material is sufficiently resistant to stretching that the sheet does not reach the bottom of the conduit when the vacuum is applied and the foam expands to the sheet.

Preferably the grooves in the press surface of the second press plate extend along the second press plate to a position at or adjacent two side of the press plate and the source of vacuum is connected to both sides.

Preferably the conduits are smaller in transverse dimension than the cells.

Preferably the grooves are less than 0.25 inch in width and are less than 0.25 inch in depth.

Preferably the grooves are of the order of 0.125 inch in depth and are of the order of 0.187 inch in width.

Preferably the sheet is formed of polyethylene which is a plastics film which is resistant to penetration of the foam, such as Tyvek.

Preferably the foam when expanded and cured has a density less than X lbs/cu ft.

Preferably the foam when expanded and cured has a substantially constant density throughout its structure.

Preferably the foam is a polyurethane foam.

Preferably the honeycomb panel is formed from phenolic resin infused Kraft paper which is free from holes.

Preferably the honeycomb panel has a height greater than 3.0 inches and is cut after curing of the foam at spaced positions through the height to form separate panels.

Preferably the liquid foaming agent is spread over the first press plate, prior to application of the panel thereto, by applying the liquid in a pool and by tilting the plate about an axis parallel to the plate so that the pool is moved to the top to spread the liquid by gravity and the plate is tilted back and forth to cause a spreading action.

BRIEF DESCRIPTION OF THE DRAWINGS

One embodiment of the invention will now be described in conjunction with the accompanying drawings in which:

FIG. 2 is a cross sectional view showing the assembled structure during the method.

In the drawings like characters of reference indicate corresponding parts in the different figures.

DETAILED DESCRIPTION

Figure 1:
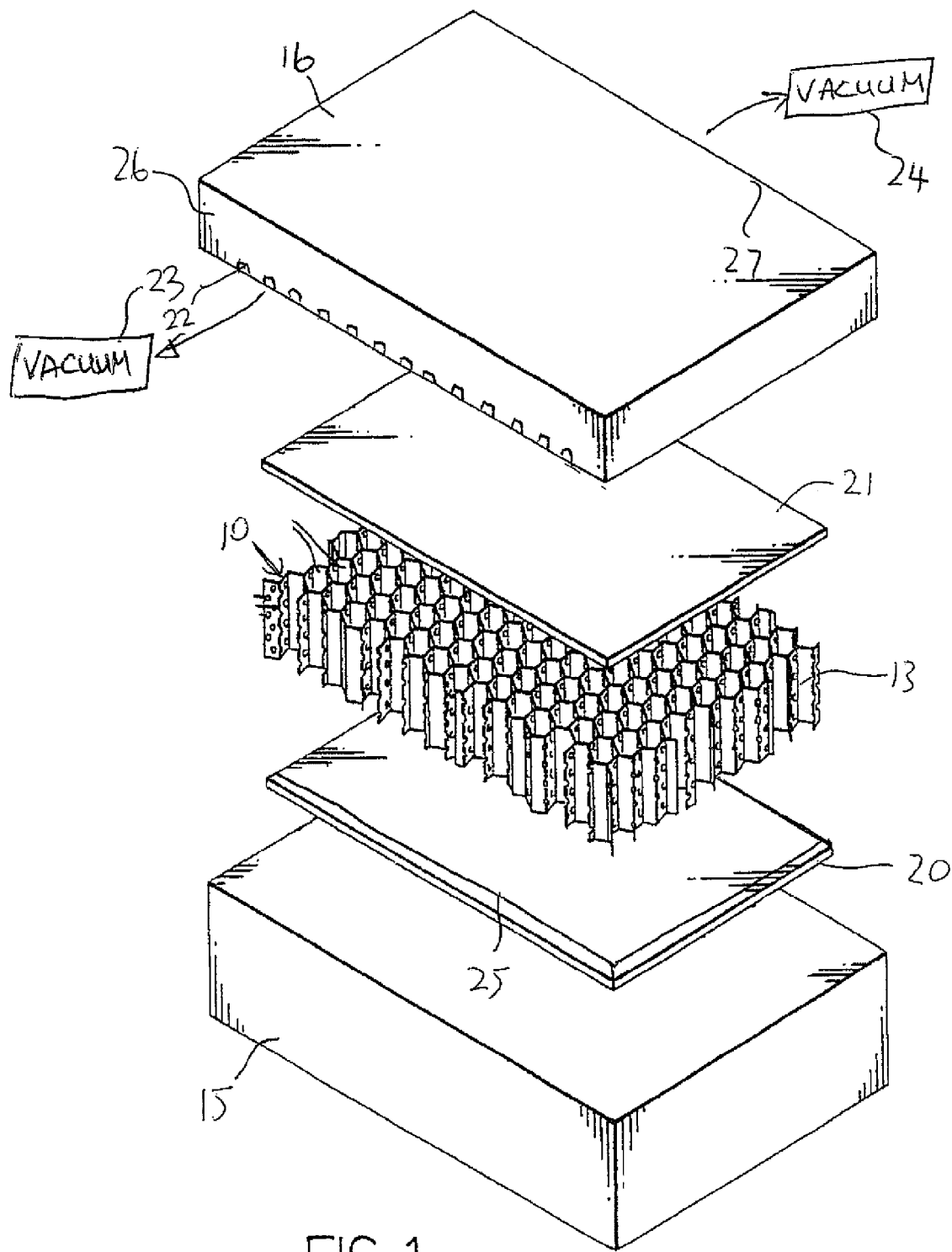
FIG. 1 is an exploded view showing the components of the composite product being assembled for the method of forming the product.

A conventional honeycomb panel 10 has a first face 11 and a second opposite face 12 and is formed by an array of hexagonal tubular cells 13 extending between the first and second faces. The honeycomb panel is typically formed from phenolic resin infused Kraft paper but other suitable materials can be used which are selected to bond to the foam and to provide a suitable compression strength. The honeycomb panel has a height preferably greater than 3.0 inches and preferably of the order of 4.0 inches. However panels can be manufactures in the range 1 to 12 inches.

The panel is introduced between a first press plate 15 with a press surface 17 in contact with the first face 11 and a second press plate 16 with a press surface 18 in contact with the second face 12. The press plates are of a simple stationary nature in that the plates simply move together and apart to allow the introduction and removal of the part and remain in place during the whole forming process. The forming and curing process can be of the order of 45 minutes and the structure remains stationary and in place during that curing process.

A first sheet 20 of a material such as Tyvek (trademark) manufactured by DuPont is laid onto the first face of the panel between the conduits and the first face of the panel and a second sheet 21 of the same material is laid over the upper face of the panel to be located between the upper face of the panel and the second press plate. Each of the sheets have the characteristics that it is permeable to air, substantially impermeable to liquid and resistant to bonding to the foam so that the sheet is formed of polyethylene which is resistant to binding to any foam material. The sheet is a plastics film which is resistant to penetration of the foam or entry of the foam into the body of the sheet so that the sheet and the foam remain separate with the sheet being removable simply by peeling away the sheet when the curing process is complete and the press opened.

Prior to application of the panel 10 to the first sheet 20, a layer 25 of a foaming agent is applied onto the first sheet as a thin flat film of the foaming agent. The foam is preferably polyurethane. The amount of the liquid foaming agent is selected bearing in mind the known expansion coefficient so that the expanded foam has a density in the range 2 to 30 lbs/cu ft and preferably of the order of 3 to 4 lbs/cu ft. The foaming agent expands from the first press plate into the cells so as to expand along the cells as the foaming agent forms the foam. Before application of the panel, the liquid foaming agent is applied to the bottom press plate in a pool along one edge on top of the optional sheet 20 or directly onto the top surface of the plate. The bottom plate is mounted for tilting movement about a center support shaft 40 allowing rotation in the direction 41. With the liquid in a pool along one edge, the plate is tilted so that the edge 15A is uppermost and the surface of the plate depending downwardly therefrom causing the liquid by gravity to run across the plate toward the opposite edge. By reversing the edge which is uppermost back and forth one or more times, the liquid can be spread evenly without the necessity of using a doctor blade. When the spreading action is complete the panel is located on the plate while it is held horizontal with the knowledge that equal amounts of the liquid are contained at the bottom of each cell.

The second press plate has an array of conduits 22 extending from the press surface of the second press plate to a source of vacuum 23, 24 so as to draw air through the conduits. The conduits are defined by grooves in the press surface of the second press plate and extending along the second press plate to a position at or adjacent each side 26, 27 of the press plate 16. The cells 13 and the conduits 22 are arranged such that the end of each cell 13 at the second press plate intersects with at least one of the conduits 22 such that the drawing of air from the conduits acts to draw air from the cells 13. The grooves are smaller in transverse dimension than the cells and are sufficiently small in transverse dimension and the sheet 21 of the plastics material is sufficiently resistant to stretching that the sheet does not reach the bottom 28 of the groove when the vacuum is applied and the foam expands to the sheet. The grooves are of a width that they allow the air to be withdrawn at a rate sufficient to allow the foam to expand and of a size that they are not blocked by the sheet being drawn into the groove. A width of less than 0.25 inch has been found to be suitable and preferably of the order of 187 inch in width. The grooves are also less than 0.25 inch in depth and preferably the order of 0.125 inch in depth, although the depth has merely to be sufficient to prevent blockage of the groove and a greater depth has little deleterious effect.

The expansion of the foam using the air removal system ensures that the foam expands uniformly so that the foam when expanded and cured has a substantially constant density throughout its structure. Expansion takes commonly about 2 minutes but the product must remain under the compression from the press during another roughly 45 minutes for the curing to be completed.

Tyvek is a brand of flashspun high-density polyethylene fibers, a synthetic material; the name is a registered trademark of the DuPont Company. The material is very strong; it is difficult to tear but can easily be cut with scissors or any other sharp object. Water vapor or other gas such as air can pass through Tyvek, but not liquid water.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A method for manufacturing a composite product comprising:
   providing a honeycomb panel having a first face and a second opposite face with an array of hexagonal tubular cells extending between the first and second faces;
   providing a first press plate with a press surface in contact with the first face;
   providing a second press plate with a press surface in contact with the second face;
   at the first press plate applying a layer of a foaming agent such that the foaming agent expands from the first press plate into the cells so as to expand along the cells as the foaming agent forms the foam;
   providing in the second press plate an array of conduits extending from the press surface of the second press plate to a source of vacuum so as to draw air through the conduits;
   the cells and the conduits being arranged such that the end of each cell at the second press plate intersects with at least one of the conduits such that the drawing of air from the conduits acts to draw air from the cells;
   and applying onto the first face of the panel between the conduits and the first face of the panel a sheet of a material having the characteristics that it is permeable to air, substantially impermeable to liquid and resistant to bonding to the foam.

2. The method according to claim 1 wherein the conduits comprise grooves in the press surface of the second press plate and extending along the second press plate to a position at or adjacent at least one side of the press plate.

3. The method according to claim 2 wherein the grooves in the press surface of the second press plate extend along the second press plate to a position at or adjacent two side of the press plate and the source of vacuum is connected to both sides.

4. The method according to claim 2 wherein the grooves are smaller in transverse dimension than the cells.

5. The method according to claim 2 wherein the grooves are sufficiently small in transverse dimension and the sheet of material is sufficiently resistant to stretching that the sheet does not reach the bottom of the groove when the vacuum is applied and the foam expands to the sheet.

6. The method according to claim 2 wherein the grooves are less than 0.25 inch in width.

7. The method according to claim 2 wherein the grooves are less than 0.25 inch in depth.

8. The method according to claim 2 wherein the grooves are of the order of 0.125 inch in depth.

9. The method according to claim 2 wherein the grooves are of the order of 0.187 inch in width.

10. The method according to claim 1 wherein the sheet is formed of polyethylene.

11. The method according to claim 1 wherein the sheet is a plastics film which is resistant to penetration of the foam.

12. The method according to claim 1 wherein the foam when expanded and cured has a density of the order of 3-4 lbs/cu ft.

13. The method according to claim 12 wherein the foam when expanded and cured has a substantially constant density throughout its structure.

14. The method according to claim 1 wherein the foam is formed from polyurethane.

15. The method according to claim 1 wherein the honeycomb panel is formed from phenolic resin infused Kraft paper.

16. The method according to claim 1 wherein the honeycomb panel has a height greater than 3.0 inches.

17. The method according to claim 1 wherein the honeycomb panel is cut after curing of the foam at spaced positions through the height to form separate panels.

18. The method according to claim 1 wherein the liquid foaming agent is spread over the first press plate by applying the liquid in a pool and by tilting the plate about an parallel to the plate axis so that the pool is moved to the top to spread the liquid by gravity.

19. The method according to claim 18 wherein the plate is tilted back and forth about the axis.

* * * * *